(12) United States Patent
Draznin et al.

(10) Patent No.: US 9,220,074 B2
(45) Date of Patent: Dec. 22, 2015

(54) BEACON DEVICE FOR CONTROLLING SIGNAL STRENGTHS IN TARGET LOCATIONS

(71) Applicants: Verizon Patent and Licensing Inc., Basking Ridge, NJ (US); Cellco Partnership, Basking Ridge, NJ (US)

(72) Inventors: Sagiv Draznin, Walnut Creek, CA (US); Arda Aksu, Martinez, CA (US); Mingxing S. Li, San Jose, CA (US); Donna L. Polehn, Kirkland, WA (US); Jyothi Keshavdas, Pleasanton, CA (US); Kent W. Hughes, Oakland, CA (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 4 days.

(21) Appl. No.: 14/196,223

(22) Filed: Mar. 4, 2014

(65) Prior Publication Data

US 2015/0257112 A1 Sep. 10, 2015

(51) Int. Cl.
*H04B 7/00* (2006.01)
*H04W 52/28* (2009.01)
*H04W 4/04* (2009.01)

(52) U.S. Cl.
CPC ............. *H04W 52/283* (2013.01); *H04W 4/04* (2013.01)

(58) Field of Classification Search
CPC ... H04W 52/24; H04W 52/50; H04W 52/367; H04W 52/12; H04W 52/40; H04W 88/08; H04W 88/085; H04W 16/28; H04W 8/245; H04W 24/02; H04W 88/02
USPC .............. 455/115.1, 115.3, 418–420, 422.1, 455/435.1, 456.1, 456.5, 456.6, 507, 513, 455/517, 522, 550.1, 551, 560, 561
See application file for complete search history.

(56) References Cited

U.S. PATENT DOCUMENTS 8,126,497 B1 * 2/2012 Vargantwar et al. .......... 455/522
2009/0005102 A1 * 1/2009 Das et al. ...................... 455/522

* cited by examiner

*Primary Examiner* — Nhan Le

(57) ABSTRACT

A device is configured to store target location information indicating an acceptable signal strength at a target location. The device may receive a signal emitted from a base station. The signal may be received at the target location. The device may measure the signal strength of the signal at the target location. The device may transmit a signal strength message including information based on the signal strength. The signal strength message may cause the base station to adjust a power with which signals are emitted from the base station such that the signals satisfy the acceptable signal strength at the target location.

20 Claims, 6 Drawing Sheets

100

BEACON DEVICE FOR CONTROLLING SIGNAL STRENGTHS IN TARGET LOCATIONS

BACKGROUND

Base stations emit radio frequency (RF) signals that may be received by user devices (e.g., smart phones, tablet computers, etc.) for communication. The RF signals may be emitted with different power. The power with which the RF signals are emitted may affect the working range of the base station and/or a quality of communication with the user devices.

DETAILED DESCRIPTION OF PREFERRED EMBODIMENTS

The following detailed description of example implementations refers to the accompanying drawings. The same reference numbers in different drawings may identify the same or similar elements.

RF signals with strong signal strengths may not be desired at all locations. For example, it may be desirable to limit people's exposure to RF signals at certain locations (e.g., schools, hospitals, etc.). Conversely, RF signals with weak signal strengths may not be desirable at all locations. For example, it may be desirable to have strong RF signals where large amounts of people gather so that the people may use their user devices to communicate (e.g., at a football game). Operator networks that control base stations may be able to send signals to the base stations to adjust the power with which the RF signals are emitted from the base stations. However, ensuring that the operator network controls power settings so that signal strengths at certain locations are consistent with desired and/or required levels may be difficult. Implementations described herein may provide a beacon device, placed at target locations, which may send messages to base stations to control the signal strength of RF signals at the target locations by adjusting the power with which the base stations emit RF signals.

Figure 1:
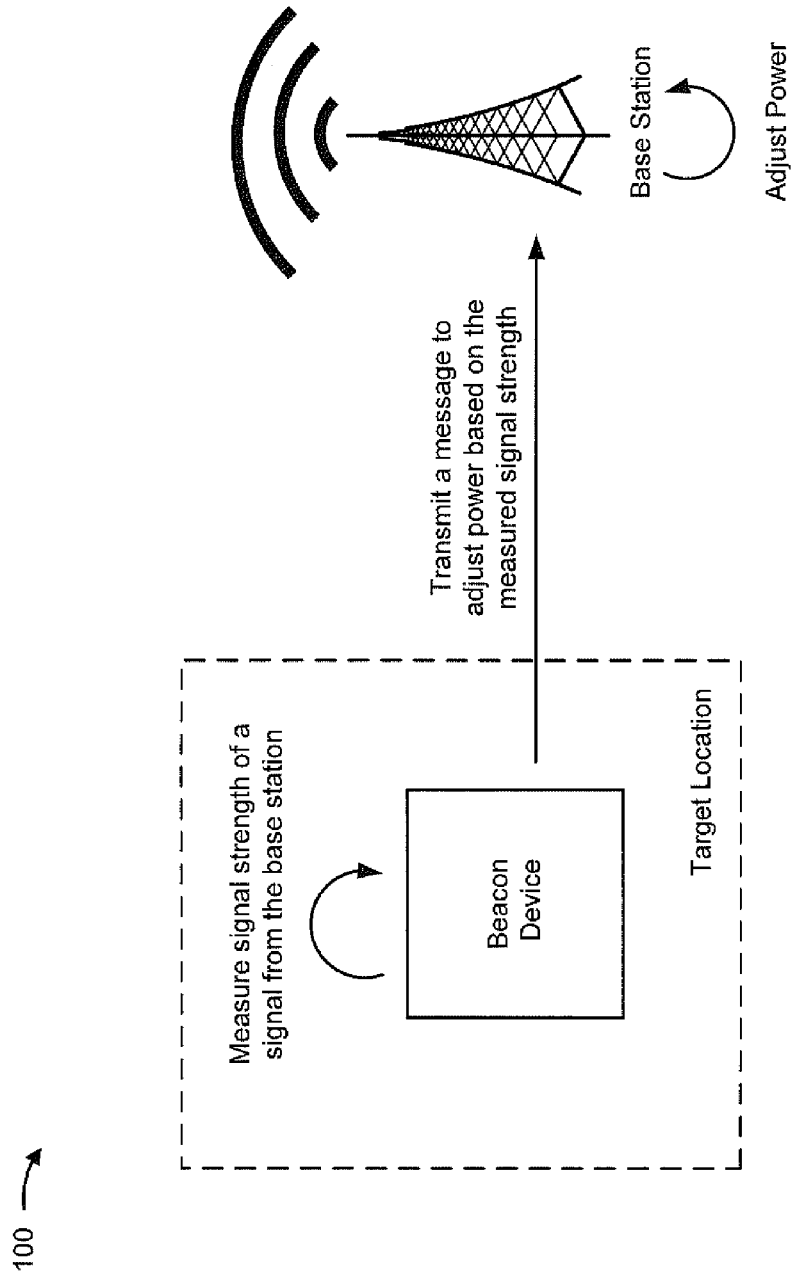
FIG. 1 is a diagram of an overview of an example implementation described herein.

FIG. 1 is a diagram of an overview of an example implementation 100 described herein. As shown in FIG. 1, a beacon device may be placed at a target location. Assume the beacon device stores information indicating a threshold value for an acceptable signal strength at the target location.

As further shown in FIG. 1, a base station may be located near the target location and may emit signals at a certain power. The beacon device may detect a signal emitted from the base station and measure a signal strength of the signal at the target location. The beacon device may compare the measured signal strength with the threshold value for an acceptable signal strength. The beacon device may determine whether the measured signal strength satisfies the threshold value based on the comparison. If the measured signal strength does not satisfy the threshold value, the beacon device may generate a message instructing the base station to adjust the power with which signals are emitted.

The beacon device may generate a signal (e.g., a RF signal) including the message and send the message directly to the base station. In some implantations, the beacon device may send the message to the base station via a network (e.g., the Internet). The base station may receive the message and adjust a power setting based on the message. The base station may emit signals at the adjusted power setting.

Additionally, or alternatively, the beacon device may send the message to a management device that regulates an operator network with which the base station is associated. The clearing house may receive the message and use the information therein to ensure the base station emits signals that comply with requirements established for target locations.

In this way, signal strengths at target locations may be controlled and kept at desired levels using a beacon device.

Figure 2:
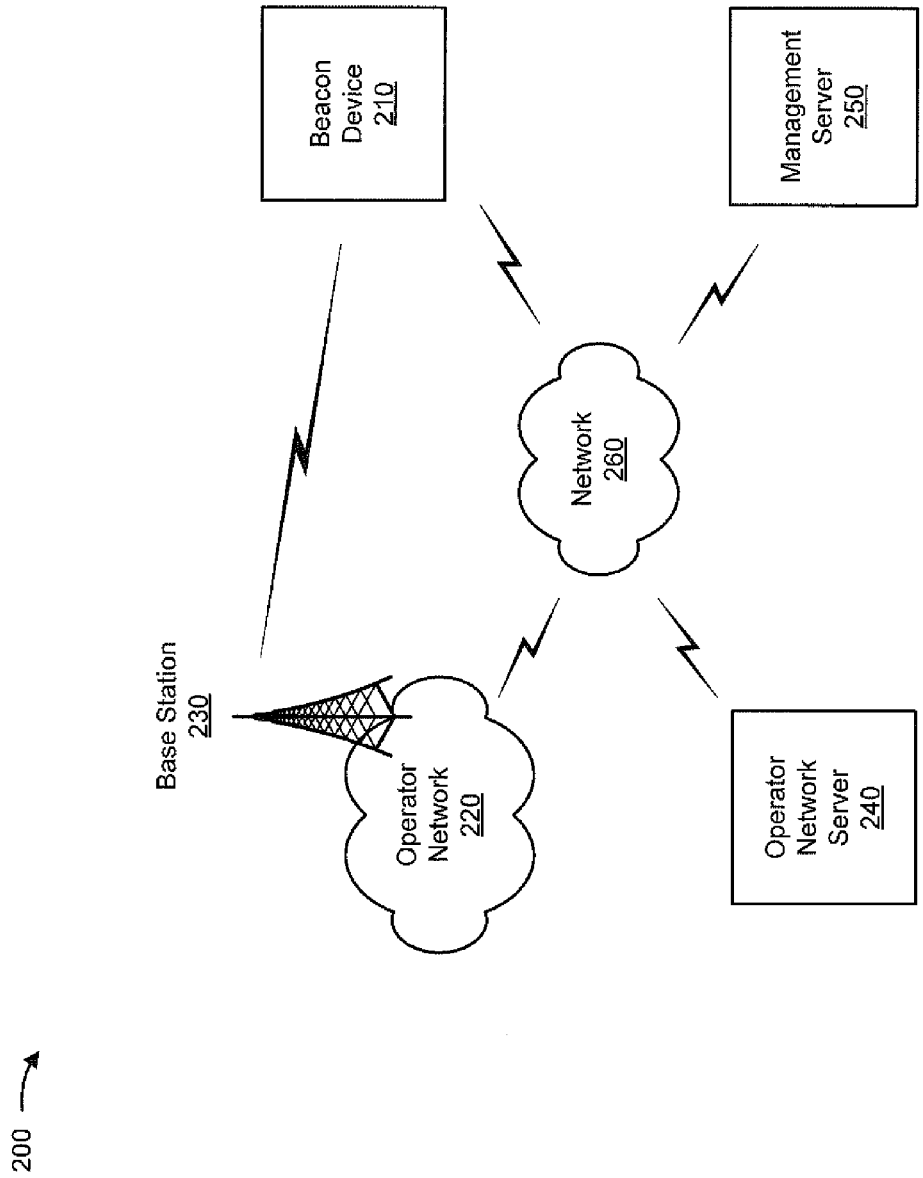
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a beacon device 210, an operator network 220, a base station 230, an operator network server 240, a management server 250, and/or a network 260.

Beacon device 210 may include a device capable of receiving and providing information. In some implementations, beacon device 210 may include a communication interface that allows beacon device 210 to receive information from and/or transmit information to other devices in environment 200. For example, beacon device 210 may communicate with base station 230 via an air interface and/or via network 260 via a wired and/or a wireless interface.

Operator network 220 may include an evolved packet system (EPS) that includes a long term evolution (LTE) network and/or an evolved packet core (EPC) that operate based on a third generation partnership project (3GPP) wireless communication standard. The LTE network may be a radio access network (RAN) that includes one or more base stations (e.g., base station 230), such as eNodeBs (eNBs), via which client devices (e.g., smart phones, tablet computers, machine-to-machine (M2M) devices, etc.) communicate with the EPC. The EPC may include a serving gateway (SGW), a mobility management entity device (MME), and/or a packet data network gateway (PGW) that enables the client devices to communicate with network 260 and/or an Internet protocol (IP) multimedia subsystem (IMS) core. The IMS core may include a home subscriber server (HSS)/authentication, authorization, accounting (AAA) server and/or a call session control function (CSCF) server and may manage certain information and services, such as authentication, session initiation, account information, and/or a user profile, associated with the client devices. The LTE network may include multiple base stations 230, and the EPC may include multiple SGWs, MMEs, and/or PGWs. Additionally, or alternatively, operator network 220 may include a cellular network, a public land mobile network ("PLMN"), a second generation ("2G") network, a third generation ("3G") network, a fourth generation ("4G") network, a fifth generation ("5G") network, and/or a similar type of network Base station 230 may include one or more network devices that receive, process, and/or transmit traffic, such as audio, video, text, and/or other data, destined for and/or received from client devices. In an example implementation, base station 230 may be an eNB device and may be part of the LTE network. Base station 230 may receive traffic from and/or send traffic to network 260 via the SGW and the PGW. Base station 230 may send traffic to and/or receive traffic from the client devices via an air interface. Additionally, or alternatively, base station 230 may communicate with beacon device 210 via an air interface.

Operator network server 240 may include one or more server devices capable of processing and/or routing information. In some implementations, operator network server 240 may include a communication interface that allows operator network server 240 to receive information from and/or transmit information to other devices in environment 200. In some implementations, operator network server 240 may be included in operator network 220.

Management server 250 may include one or more server devices capable of processing and/or routing information. In some implementations, management server 250 may include a communication interface that allows management server 250 to receive information from and/or transmit information to other devices in environment 200.

Network 260 may include one or more wired and/or wireless networks. For example, network 260 may include a cellular network, a PLMN, a 2G network, a 3G network, a 4G network, a 5G network, a LTE network, and/or a similar type of network. Additionally, or alternatively, network 260 may include a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, and/or a combination of these or other types of networks.

The number of devices and/or networks shown in FIG. 2 is provided for explanatory purposes. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200. Devices of environment 200 may interconnect via wired connections, wireless connections, or a combination of wired and wireless connections.

Figure 3:
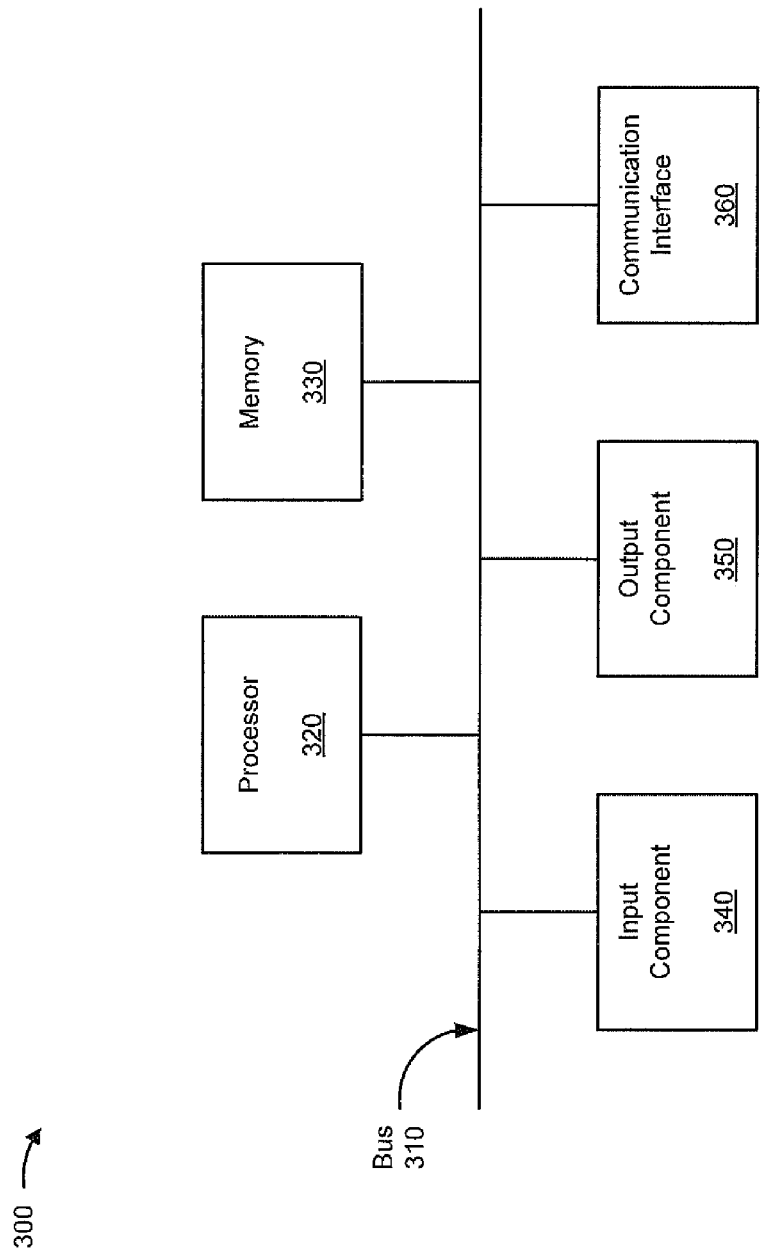
FIG. 3 is a diagram of example components of a device that corresponds to one or more devices of FIG. 2.

FIG. 3 is a diagram of example components of a device 300 that corresponds to one or more devices of FIG. 2. Device 300 may correspond beacon device 210, base station 230, operator network server 240, and/or management server 250. Additionally, or alternatively, beacon device 210, base station 230, operator network server 240, and/or management server 250 may include one or more devices 300 and/or one or more components of device 300.

As illustrated in FIG. 3, device 300 may include a bus 310, a processor 320, a memory 330, an input component 340, an output component 350, and/or a communication interface 360.

Bus 310 may include a path that permits communication among the components of device 300. Processor 320 may include a processor (e.g., a central processing unit, a graphics processing unit, an accelerated processing unit), a microprocessor, and/or another type of processing component (e.g., a field-programmable gate array ("FPGA"), an application-specific integrated circuit ("ASIC"), etc.) that interprets and/or executes instructions. Memory 330 may include a random access memory ("RAM"), a read only memory ("ROM"), and/or another type of dynamic or static storage device (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, etc.). Input component 340 may also include a sensor for sensing information.

Output component 350 may include a component that outputs information from device 300 (e.g., a display, a speaker, one or more light-emitting diodes ("LEDs"), etc.).

Communication interface 360 may include a transceiver-like component, such as a transceiver and/or a separate receiver and transmitter that enables device 300 to communicate with other devices, such as via a wired connection, a wireless connection, or a combination of wired and wireless connections. For example, communication interface 360 may include an Ethernet interface, an optical interface, a coaxial interface, an infrared interface, a RF interface, a universal serial bus ("USB") interface, or the like.

Device 300 may perform various operations described herein. Device 300 may perform these operations in response to processor 320 executing software instructions included in a computer-readable medium, such as memory 330. A computer-readable medium is defined as a non-transitory memory device. A memory device includes memory space within a single storage device or memory space spread across multiple storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided for explanatory purposes. In practice, device 300 may include additional components, fewer components, different components, or differently arranged components than those shown in FIG. 3.

Figure 4:
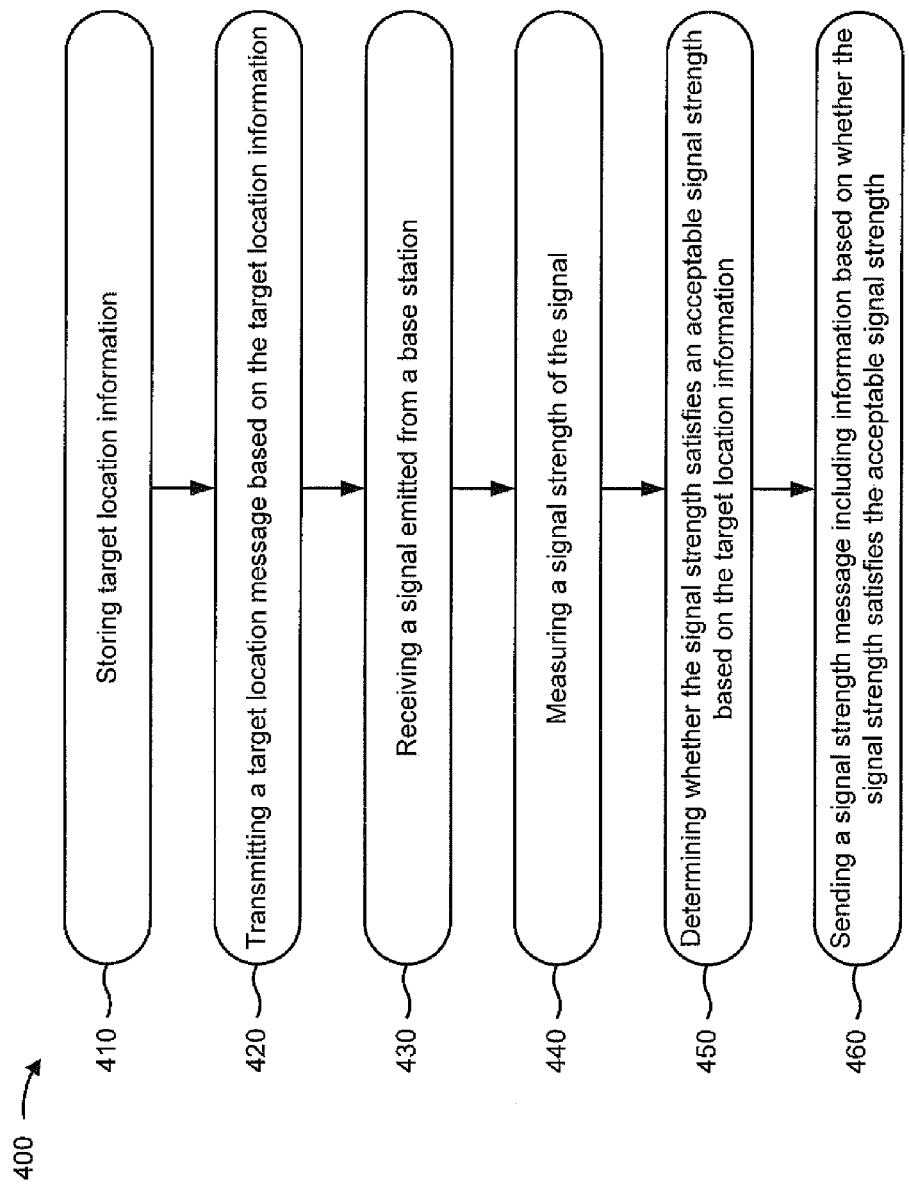
FIG. 4 is a flowchart of an example process for using a beacon device to change a power with which a signal is emitted from a base station.

FIG. 4 is a flowchart of an example process 400 for using beacon device 210 to change a power with which a signal is emitted from base station 230. In some implementations, one or more process blocks of FIG. 4 may be performed by beacon device 210. Additionally, or alternatively, one or more process blocks of FIG. 4 may be performed by another device or a group of devices separate from or including beacon device 210.

As shown in FIG. 4, process 400 may include storing target location information (block 410). For example, beacon device 210 may store the target location information.

An operator of operator network 220 and/or another entity (e.g., a government) may issue beacon device 210 for placement in a target location. The target location may be an area or a location where signal strengths of signals emitted from base stations 230 are regulated. The operator of operator network 220 and/or the other entity may determine which locations are target locations. For example, target locations may include areas, such as a hospital, a school, a playground, a park, a nursing home, a highway, a stadium, an auditorium, etc.

Beacon device 210 may store the target location information in a memory included in beacon device 210 and/or in a memory accessible by beacon device 210. When necessary, beacon device 210 may obtain the target location information from the memory.

In some implementations, the target location information may include a target location identifier (ID) identifying the target location. For example, the target location ID may identify a kind of target location (e.g., a school) and/or a specific target location (e.g., George Washington Elementary School).

In some implementations, the target location information may include threshold information indicating an acceptable signal strength for signals in the target location. For example, the threshold information may indicate a maximum acceptable signal strength for signals in the target location and/or a minimum acceptable signal strength for signals in the target location. The threshold information may store multiple acceptable signal strengths associated with different times and/or dates. For example, a first time may be associated with a first acceptable signal strength and a second time may be associated with a second acceptable signal strength.

In some implementations, the target location information may include authentication information. The authentication information may be used to authenticate messages sent from beacon device 210. For example, the authentication information may include a password. The password may be a string of characters of any length. Additionally, or alternatively, the authentication information may indicate an encryption technique used to encrypt messages sent from beacon device 210.

As further shown in FIG. 4, process 400 may include transmitting a target location message based on the target location information (block 420). For example, beacon device 210 may transmit the target location message.

In some implementations, beacon device 210 may be a passive device that transmits the target location message via an air interface. One or more base stations 230 may receive the target location message. The target location message may include the target location ID for the target location. Base station 230 may store power settings information in a memory included in base station 230 and/or in a memory accessible by base station 230 (e.g., a memory included in operator network 220). The power settings information may indicate power settings associated with target location IDs. For example, the power settings information may indicate power settings associated with a kind of target location and/or a specific target location. Base station 230 may obtain the target location ID from the received target location message and determine a power setting for emitting signals based on the target location ID and the power settings information. If necessary, base station 230 may change a power setting used for emitting signals to be consistent with the determined power setting.

Additionally, or alternatively, the target location message may indicate the acceptable signal strength for a signal in the target location. In some implementations, the target location message may indicate a time and/or a date associated with the acceptable signal strength. In some implementations, beacon device 210 may send out different target location messages at different times indicating acceptable signal strengths associated with the time that the target location message is sent. Base station 230 may obtain the information indicating the acceptable signal strength from the received target location message and determine a power setting for emitting signals based on the acceptable signal strength. If necessary, base station 230 may change a power setting used for emitting signals to be consistent with the determined power setting.

Additionally, or alternatively, the target location message may indicate the password included in the authentication information. Base station 230 may receive the target location message and obtain the password. The base station 230 may authenticate the target location message based on the password to ensure the target location message is sent by a beacon device 210 authorized to cause base station 230 to adjust a power setting.

In some implementations, beacon device 210 may be an active device that receives signals from base station 230 and sends messages to base station 230, rather than just emitting target location messages like a passive device. In such a case, the target location message may include a request to connect to base station 230 and to establish communication with base station 230. In some implementations, beacon device 210 may send the target location message periodically and/or based on a trigger (e.g., a time indicated by the target location information or receiving a signal from base station 230).

As further shown in FIG. 4, process 400 may include receiving a signal emitted from base station 230 (block 430). For example, beacon device 210 may receive the signal emitted from base station 230.

Base station 230 may emit signals at a certain power. The signal may be a RF signal. Beacon device 210 may receive the signal emitted from base station 230. In some implementations, the signal may be received in response to the target location message transmitted by beacon device 210. Additionally, or alternatively, the signal may be received independent of the target location message transmitted by beacon device 210.

The signal may include a base station ID indicating a base station 230 that emitted the signal. Beacon device 210 may receive signals from multiple base stations 230. In this case, each signal may include a respective base station ID indicating a respective base station 230 that emitted the signal.

As further shown in FIG. 4, process 400 may include measuring a signal strength of the signal (block 440). For example, beacon device 210 may measure the signal strength of the signal received from base station 230. The signal strength may be indicated by a received signal strength identifier (RSSI).

As further shown in FIG. 4, process 400 may include determining whether the signal strength satisfies an acceptable signal strength based on the target location information (block 450). For example, beacon device 210 may determine whether the signal strength satisfies an acceptable signal strength.

Beacon device 210 may compare the measured signal strength of the signal with an acceptable signal strength indicated by the target location information. Beacon device 210 may determine whether the signal strength of the signal emitted by base station 230 satisfies the acceptable signal strength based on the comparison.

In some implementations, beacon device 210 may determine an acceptable signal strength based on the time and/or date. The target location information stored by beacon device 210 may indicate different acceptable signal strengths associated with different times and/or dates. Beacon device 210 may obtain the acceptable signal strength associated with a present time (e.g., a time the signal strength is measured). Beacon device 210 may compare the measured signal strength with the acceptable signal strength associated with the present time. Beacon device 210 may determine whether the signal strength of the signal emitted by base station 230 satisfies the acceptable signal strength based on the comparison.

As further shown in FIG. 4, process 400 may include sending a signal strength message including information based on whether the signal strength satisfies the acceptable signal strength (block 460). For example, beacon device 210 may send the signal strength message.

The signal strength message may indicate whether the signal emitted from base station 230 satisfies the acceptable signal strength at the target location. For example, the signal strength message may indicate that the signal strength at the target location is acceptable or is not acceptable. Additionally, or alternatively, the signal strength message may indicate that the signal strength at the target location is greater than the acceptable signal strength or less than the acceptable signal strength. Additionally, or alternatively, the signal strength message may indicate the signal strength (e.g., a RSSI) and/or the threshold information (e.g., a maximum/minimum acceptable signal strength that may be associated with times and/or dates). Additionally, or alternatively, the signal strength message may include an instruction for base station 230 to adjust a power setting. For example, the instruction may instruct base station 230 to increase or decrease a power level used to emit signals from base station 230. In some implementations, the instruction may indicate an amount to increase or decrease the power level. Beacon device 210 may determine the amount based on the measured signal strength and the acceptable signal strength. Additionally, or alternatively, the instruction may indicate a length of time to increase or decrease the power level. In some implementations, the signal strength message may include the base station ID of base station 230 that emitted the signal and/or the target location ID.

In some implementations, beacon device 210 may identify the base station 230 that sent the signal based on the base station ID included in the signal. Beacon device 210 may send the signal strength message directly to base station 230 via an air interface. Additionally, or alternatively, beacon device 210 may send the signal strength message indirectly to base station 230 via network 260 (e.g., the Internet). Base station 230 may receive the signal strength message and determine a power setting based on the signal strength message.

For example, if the signal strength message indicates the signal strength is greater than the acceptable level, base station 230 may decrease the power with which signals are emitted from base station 230. Additionally, or alternatively, base station 230 may decrease the power based on the instruction and/or by an amount indicated by the instruction included in the signal strength message. Additionally, or alternatively, base station 230 may determine an amount to decrease the power based on the signal strength indicated by the signal strength message and the maximum acceptable signal strength.

If the signal strength message indicates the signal strength is less than the acceptable level, base station 230 may increase the power with which signals are emitted from base station 230. Additionally, or alternatively, base station 230 may increase the power based on the instruction and/or by an amount indicated by the instruction included in the signal strength message. Additionally, or alternatively, base station 230 may determine an amount to increase the power based on the signal strength indicated by the signal strength message and the minimum acceptable signal strength.

If the signal strength message indicates the signal strength is an acceptable signal strength, base station 230 may not change the power with which signals are emitted. Additionally, or alternatively, base station 230 may increase or decrease the power with which signals are emitted based on the maximum acceptable signal strength and/or the minimum acceptable signal strength such that the signals will still be at an acceptable signal strength in the target location.

Base station 230 may change the power setting based on the signal strength message and emit signals with an adjusted power. In some implementations, base station 230 may change the power setting for one or more antennas included in base station 230. For example, base station 230 may change a power setting for an antenna used to emit the signal received by beacon device 210 and not change a power setting for other antennas.

In some implementations, beacon device 210 may send the signal strength message to operator network server 240 via network 260. Operator network server 240 may control base stations 230 included in operator network 230. Operator network server 240 may store target location information for multiple target locations. Operator network server 240 may store a data structure that associates the target location information (e.g., the target location ID, the maximum acceptable signal strength, the minimum acceptable signal strength, etc.) with signal strengths measured at the target location. Operator network server 240 may receive the signal strength message from beacon device 210, and obtain information identifying the base station ID and the measured signal strength from the signal strength message. Operator network server 240 may store the information identifying the signal strength and the base station ID in the data structure. For example, operator network server 240 may add an entry in the data structure associating the signal strength, the base station ID, and the target location ID. Operator network server 240 may determine based on the data structure whether base station 230 should adjust a power setting. Additionally, or alternatively, operator network server 240 may send an instruction to base station 230 to adjust a power setting. Base station 230 may receive the instruction and adjust a power setting based on the instruction.

In some implementations, beacon device 210 may send the signal strength message to management server 250 via network 260. Management server 250 may function as a clearing house for base stations 230 included in one or more operator networks 220. Management server 250 may be operated by an operator independent of operator networks 220 (e.g., a government). The operator may regulate operator networks 220. Management server 250 may store target location information for multiple target locations. Management server 250 may store a data structure that associates the target location information (e.g., the target location ID, the maximum acceptable signal strength, the minimum acceptable signal strength, etc.) with signal strengths measured at the target location. Management server 250 may receive the signal strength message, and obtain information identifying the base station ID and the measured signal strength from the signal strength message. Management server 250 may store the information identifying the signal strength and the base station ID in the data structure. For example, management server 250 may add an entry in the data structure associating the signal strength, the base station ID, and the target location ID. Management server 250 may determine based on the data structure whether base station 230 complies with the acceptable signal strengths established for the target location. The operator of management server 250 may inform an operator that controls base station 230 whether base station 230 complies with the acceptable signal strengths established for the target location.

While a series of blocks has been described with regard to FIG. 4, the blocks and/or the order of the blocks may be modified in some implementations. Additionally, or alternatively, non-dependent blocks may be performed in parallel.

Figure 5:
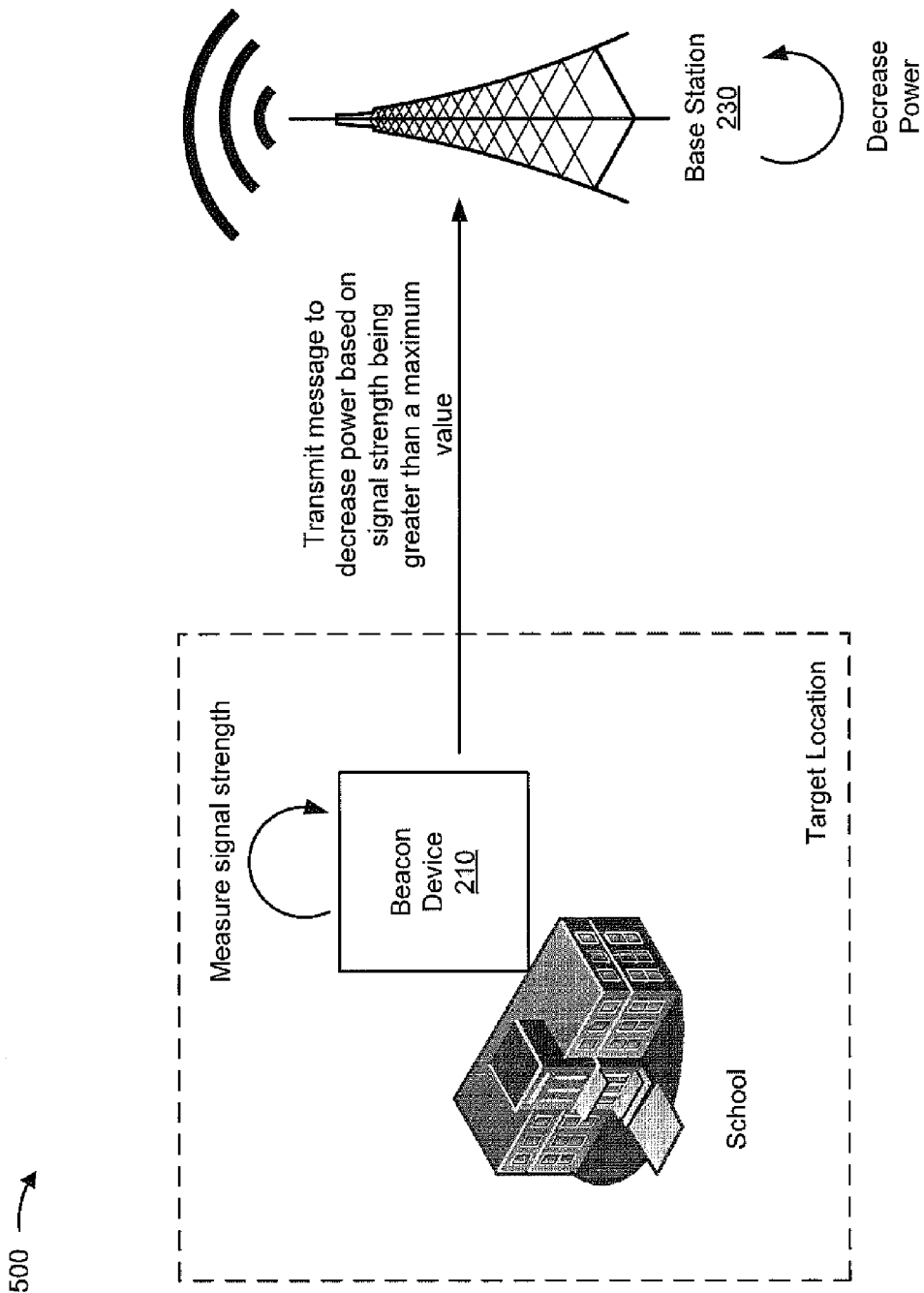
FIG. 5 is a diagram of an example implementation relating to the example process shown in FIG. 4.

FIG. 5 is a diagram of an example implementation 500 relating to process 400 shown in FIG. 4. In example implementation 500, assume a school has been designated a target location. As shown in FIG. 5, beacon device 210 may be placed at the school. Assume beacon device 210 stores target location information indicating a maximum acceptable signal strength of −30 decibels relative to one milliwatt (dBm) at the target location.

As further shown in FIG. 5, base station 230 may be located near the target location and may emit signals at a certain power level. Beacon device 210 may detect a signal emitted from base station 230 and measure a signal strength of the signal at the target location. Assume beacon device 210 measures a signal strength of −10 dBm. Beacon device 210 may compare the measured signal strength (e.g., −10 dBm) with the maximum acceptable signal strength (e.g., −30 dBm). Beacon device 210 may determine the measured signal strength is greater than the maximum acceptable signal strength. Beacon device 210 may generate a signal strength message instructing base station 230 to decrease the power with which signals are emitted based on the determination.

Beacon device 210 may generate a signal including the signal strength message and send the signal strength message directly to base station 230 via an air interface. Base station 230 may receive the signal strength message and decrease the power level with which signals are emitted. Base station 230 may emit signals at the decreased power level.

In this way, signal strengths at a target location (e.g., the school) may be controlled and kept at acceptable levels using a beacon device.

Figure 6:
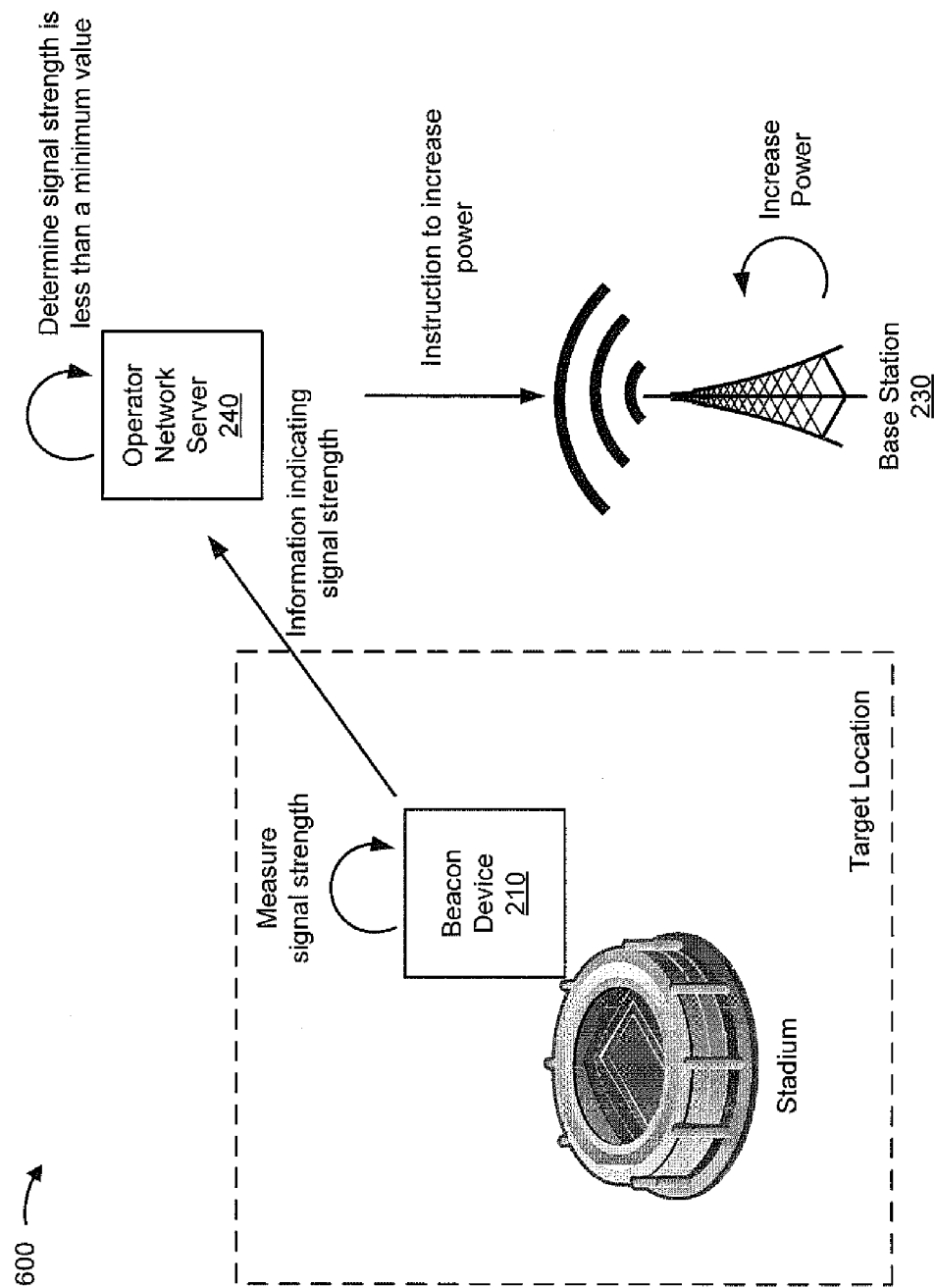
FIG. 6 is a diagram of an example implementation relating to the example process shown in FIG. 4.

FIG. 6 is a diagram of an example implementation 600 relating to process 400 shown in FIG. 4. In example implementation 600, assume a stadium has been designated a target location. As shown in FIG. 6, beacon device 210 may be placed at the stadium. Assume beacon device 210 stores target location information including a target location ID identifying the football stadium.

In implementation 600, base station 230 may be near the target location and may emit signals at a certain power level. Beacon device 210 may detect a signal emitted from base station 230 and measure a signal strength of the signal at the target location. Assume beacon device 210 measures a signal strength of −80 dBm. Beacon device 210 may obtain a base station ID from the signal that identifies base station 230 that emitted the signal.

Beacon device 210 may generate a signal strength message including information identifying the signal strength (e.g., −80 dBm), the base station ID, and the target location ID. Beacon device 210 may transmit the signal strength message to operator network server 240 via network 260.

Operator network server 240 may receive the signal strength message. Operator network server 240 may store a target location data structure including an entry for the football stadium associated with the target location ID. Assume the entry includes threshold information indicating a minimum acceptable signal strength of −50 dBm at the football stadium from 1:00 PM to 5:00 PM (e.g., during a football game at the stadium). Further assume, the present time is 1:30 PM. Operator network server 240 may query the target location data structure using the target location ID obtained from the signal strength message and obtain the threshold information associated with the target location ID. Operator network server 240 may determine that the present time (e.g., 1:30 PM) is within the time frame indicated by the threshold information (e.g., 1:00 PM to 5:00 PM). Operator network server 240 may determine the measured signal strength (e.g., −80 dBm) is less than the minimum acceptable signal strength (e.g., −50 dBm). Accordingly, operator network server 240 may determine that the signal strength is too low. Operator network server 240 may identify base station 230 based on the base station ID included in the signal strength message and generate an instruction for base station 230 to increase the power level used to emit signals until 5:00 PM.

Operator network server 240 may transmit the instruction to base station 230. Base station 230 may receive the instruction and increase the power level used to emit signals. Base station 230 may emit signals with the increased power level until 5:00 PM. After 5:00 PM, base station may emit signals at the original power level and/or a power level less than −50 dBm.

In this way, signal strengths at a target location (e.g., the football stadium) may be controlled and kept at acceptable levels using a beacon device.

Implementations described herein may provide a beacon device, placed at a target location, which may send messages to base stations to control the signal strength of signals at the target locations by adjusting the power with which the base stations emit signals.

The foregoing disclosure provides illustration and description, but is not intended to be exhaustive or to limit the implementations to the precise form disclosed. Modifications and variations are possible in light of the above disclosure or may be acquired from practice of the implementations.

To the extent the aforementioned implementations collect, store, or employ personal information provided by individuals, it should be understood that such information shall be used in accordance with all applicable laws concerning protection of personal information. Storage and use of personal information may be in an appropriately secure manner reflective of the type of information, for example, through various encryption and anonymization techniques for particularly target information.

As used herein, the term "component" is intended to be broadly construed as hardware, firmware, or a combination of hardware and software.

Some implementations are described herein in conjunction with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be an open-ended term. Further, the phrase "based on" is intended to mean "based, at least in part, on" unless explicitly stated otherwise.

What is claimed is:

1. A device, comprising:
one or more processors to:
store target location information identifying a target location,
the target location information including a target location identifier associated with the target location;
receive a signal emitted from a base station,
the signal being received at the target location;
measure a signal strength of the signal at the target location;
compare, based on measuring the signal strength, the signal strength to a particular signal strength associated with the target location identifier; and
transmit, based on the comparison, a signal strength message including information based on the signal strength,
the signal strength message causing the base station to adjust a power level with which signals are emitted from the base station such that the signals satisfy an acceptable signal strength, based on the target location identifier, at the target location.

2. The device of claim 1, where the one or more processors, when transmitting the signal strength message, are to:
transmit the signal strength message directly to the base station via a wireless signal.

3. The device of claim 1, where the one or more processors, when transmitting the signal strength message, are to:
transmit the signal strength message to the base station via a network device.

4. The device of claim 1, where the one or more processors are further to:
determine that the signal strength does not satisfy the acceptable signal strength,
the signal strength message indicating the signal strength does not satisfy at the acceptable signal strength.

5. The device of claim 1, where the one or more processors are further to:
determine that the signal strength does not satisfy the acceptable signal strength,
the signal strength message including an instruction to adjust the power level with which the signals are emitted from the base station such that the signals satisfy the acceptable signal strength at the target location.

6. The device of claim 1, where the target location information identifies a maximum acceptable signal strength, and where the one or more processors are further to:
determine that the signal strength is greater than the maximum acceptable signal strength,
the signal strength message causing the base station to decrease the power level with which the signals are emitted from the base station such that the signals satisfy the acceptable signal strength at the target location.

7. The device of claim 1, where the target location information identifies a minimum acceptable signal strength, and where the one or more processors are further to:
determine that the signal strength is less than the minimum acceptable signal strength,
the signal strength message causing the base station to increase the power level with which the signals are emitted from the base station such that the satisfy the acceptable signal strength at the target location.

8. A non-transitory computer-readable medium storing instructions, the instructions comprising:
one or more instructions that, when executed by a processor of a device, cause the processor to:
receive a signal emitted from a base station,
the signal being received at a target location,
the target location being identified by target location information,
the target location information including a target location identifier associated with the target location;
measure a signal strength of the signal at the target location;
compare, based on measuring the signal strength, the signal strength to a particular signal strength associated with the target location identifier; and
provide, based on the comparison, a signal strength message including information based on the signal strength,
the signal strength message causing the base station to adjust a power level with which signals are emitted from the base station such that the signals satisfy an acceptable signal strength, based on the target location identifier, at the target location.

9. The non-transitory computer readable medium of claim 8, where the one or more instructions to provide the signal strength message include:
one or more instructions to provide the signal strength message to a server operated by an operating network that includes the base station.

10. The non-transitory computer readable medium of claim 8, where the one or more instructions to provide the signal strength message include:
one or more instructions to provide the signal strength message to a server operated by a regulator that regulates a plurality of base stations included in a plurality of operator networks,
the plurality of base stations including the base station.

11. The non-transitory computer readable medium of claim 8, where
the signal includes a base station identifier identifying the base station,
the signal strength message includes the base station identifier, and
the signal strength message causes the base station to adjust the power level based on the base station identifier.

12. The non-transitory computer readable medium of claim 8, where the target location information indicates a time associated with the acceptable signal strength at the target location, and
where the instructions further include:
one or more instructions to determine that the signal strength does not satisfy the acceptable signal strength based on a time at which the signal strength is measured and the time associated with the acceptable signal strength.

13. The non-transitory computer readable medium of claim 8, where the target location information indicates a time range associated with the acceptable signal strength at the target location, and the one or more instructions to provide the signal strength message include:
one or more instructions to provide the signal strength message only during the time range.

14. A method, comprising:
storing, by a device, target location information identifying a target location,
the target location information including a target location identifier associated with the target location;
receiving, by the device, a signal emitted from a base station,
the signal being received by the device at the target location;
measuring, by the device, a signal strength of the signal at the target location;
comparing, by the device and based on measuring the signal strength, the signal strength to a particular signal strength associated with the target location identifier;
determining, by the device and based on the comparing, that the signal strength does not satisfy the acceptable signal strength;
transmitting, by the device and to at least one of the base station or a server, a signal strength message indicating that the signal strength does not satisfy the acceptable signal strength,
the signal strength message causing the base station to change a power level with which signals are emitted from the base station such that the signals satisfy an acceptable signal strength, based on the target location identifier, at the target location.

15. The method of claim 14, further comprising:
storing authentication information for authenticating the signal strength message; and
transmitting the authentication information to the at least one of the base station or the server to authenticate the signal strength message.

16. The method of claim 14, where the target location information indicates a time associated with the acceptable signal strength at the target location, and
where determining that the signal strength does not satisfy the acceptable signal strength includes:
determining that the signal strength does not satisfy the acceptable signal strength based on a time at which the signal strength is measured and the time associated with the acceptable signal strength.

17. The method of claim 14, where the target location information indicates a time range associated with the acceptable signal strength at the target location, and
transmitting the signal strength message includes:
transmitting the signal strength message only during the time range.

18. The method of claim 14, further comprising:
generating an instruction to change the power level with which the signals are emitted from the base station based on the signal strength not satisfying the acceptable signal strength,
the instruction being included in the signal strength message, and
the instruction causing the base station to change the power level with which the signals are emitted.

19. The method of claim 18, where the instruction indicates a length of time to change the power level with which the signals are emitted.

20. The method of claim 18, where the instruction indicates an amount to change the power level with which the signals are emitted,
the amount being determined based on the signal strength and the acceptable signal strength.

* * * * *